(12) United States Patent
Bendlin et al.

(10) Patent No.: US 10,333,740 B2
(45) Date of Patent: Jun. 25, 2019

(54) FACILITATING DETERMINATION OF TRANSMISSION TYPE VIA DEMODULATION REFERENCE SIGNAL PATTERNS

(71) Applicant: AT&T Intellectual Property I, L.P., Atlanta, GA (US)

(72) Inventors: Ralf Bendlin, Cedar Park, TX (US); Arunabha Ghosh, Austin, TX (US)

(73) Assignee: AT&T INTELLECTUAL PROPERTY I, L.P., Atlanta, GA (US)

( * ) Notice: Subject to any disclaimer, the term of this patent is extended or adjusted under 35 U.S.C. 154(b) by 0 days.

(21) Appl. No.: 15/700,151

(22) Filed: Sep. 10, 2017

(65) Prior Publication Data

US 2019/0081821 A1    Mar. 14, 2019

(51) Int. Cl.
*H04W 36/00*    (2009.01)
*H04L 25/02*    (2006.01)
(Continued)

(52) U.S. Cl.
CPC .... *H04L 25/0268* (2013.01); *H04L 12/40156* (2013.01); *H04L 25/03904* (2013.01);
(Continued)

(58) Field of Classification Search
CPC ............. H04L 41/0233; H04L 27/0008; H04L 27/2601; H04L 25/0226; H04J 11/0079;
(Continued)

(56) References Cited

U.S. PATENT DOCUMENTS 8,804,651 B2    8/2014  Li et al.
8,923,207 B2    12/2014 Ho
(Continued)

FOREIGN PATENT DOCUMENTS

EP    3364700 A1    8/2018
WO    2015000171 A1   1/2015
(Continued)

OTHER PUBLICATIONS

Dhurvey et al., "A Novel Multi-minislot Cooperative Spectrum Sensing Scheme in Cognitive Radio Networks," Sep. 2015, International Journal of Computer Applications, vol. 125, No. 10, 6 pages
(Continued)

*Primary Examiner* — Phuoc H Doan
(74) *Attorney, Agent, or Firm* — Amin, Turocy & Watson, LLP

(57) ABSTRACT

A method facilitating determination of transmission type via demodulation reference signal (DMRS) patterns is provided. In one example, the method can include generating information according to a protocol for receipt by a mobile device, wherein the information is indicative of a defined transmission type for the mobile device and wherein the protocol employs demodulation reference signal patterns; and transmitting the information to the mobile device. In some embodiments, the protocol comprises a first protocol in which the information comprises a first message transmitted in a first set of resources to communicate to the mobile device a first downlink control information (DCI) format associated with a first transmission type, and wherein the protocol further comprises a second protocol in which the information comprises a second message transmitted in a second set of resources to communicate to the mobile device a second DCI format associated with a second transmission type.

20 Claims, 10 Drawing Sheets

(51) Int. Cl.
  *H04L 25/03*  (2006.01)
  *H04L 12/40*  (2006.01)
  *H04L 27/26*  (2006.01)
  *H04L 27/06*  (2006.01)

(52) U.S. Cl.
  CPC ........ *H04L 25/03955* (2013.01); *H04L 27/06* (2013.01); *H04L 27/261* (2013.01)

(58) Field of Classification Search
  CPC ............... H04W 72/042; H04W 16/14; H04W 72/1215; H04W 72/0453; H04B 1/709
  USPC .......... 370/312; 375/316, 146, 224; 341/118
  See application file for complete search history.

(56) References Cited

U.S. PATENT DOCUMENTS

| | | | |
|---|---|---|---|
| 9,252,918 | B2 | 2/2016 | Nory et al. |
| 9,258,104 | B2 | 2/2016 | Bashar et al. |
| 9,698,892 | B2 | 7/2017 | Horiuchi et al. |
| 2012/0201187 | A1* | 8/2012 | Koo ...................... H04L 1/0027 370/312 |
| 2014/0293881 | A1 | 10/2014 | Khoshnevis et al. |
| 2016/0057753 | A1 | 2/2016 | Yang et al. |
| 2017/0127414 | A1 | 5/2017 | Yi et al. |
| 2017/0238311 | A1 | 8/2017 | Hooli et al. |
| 2017/0244535 | A1 | 8/2017 | Islam et al. |
| 2017/0353947 | A1 | 12/2017 | Ang et al. |

FOREIGN PATENT DOCUMENTS

| | | |
|---|---|---|
| WO | 2017075807 A1 | 5/2017 |
| WO | 2017177083 A1 | 10/2017 |

OTHER PUBLICATIONS

Sawahashi et al., "Radio Access Technologies for Broadband Mobile Communications," Sep. 2017, IEICE Transactions on Communications, vol. E100-B, No. 9, pp. 1674-1687, 14 pages.

International Search Report and Written Opinion for Application No. PCT/US2018/050111 dated Nov. 23, 2018, 18 pages.

TCL Communication, "Common RS for Control and Data of Mini-Slots," Aug. 21-25, 2017, 3GPP TSG RAN WG1 Meeting #90, R1-1712883, Prague, Czech Republic, 5 pages.

AT&T, "Remaining details for DMRS design," Nov. 27-Dec. 1, 2017, 3GPP TSG RAN WG1 Meeting 91, R1-1719637, Reno, USA, 5 pages.

AT&T, "Remaining details on DL/UL resource allocation," Nov. 27-Dec. 1, 2017, 3GPP TSG RAN WG1 Meeting#91, R1-1719647, Reno, USA, 7 pages.

* cited by examiner

FACILITATING DETERMINATION OF TRANSMISSION TYPE VIA DEMODULATION REFERENCE SIGNAL PATTERNS

TECHNICAL FIELD

The subject disclosure relates generally to communications systems, and, for example, to systems, methods and/or machine-readable storage media for facilitating determination of transmission type via demodulation reference signal (DMRS) patterns in a wireless communication system.

BACKGROUND

To meet the huge demand for data centric applications, Third Generation Partnership Project (3GPP) systems and systems that employ one or more aspects of the specifications of the Fourth Generation (4G) standard for wireless communications will be extended to a Fifth Generation (5G) standard for wireless communications. Unique challenges exist to provide levels of service associated with forthcoming 5G standards.

DETAILED DESCRIPTION

Figure 1:
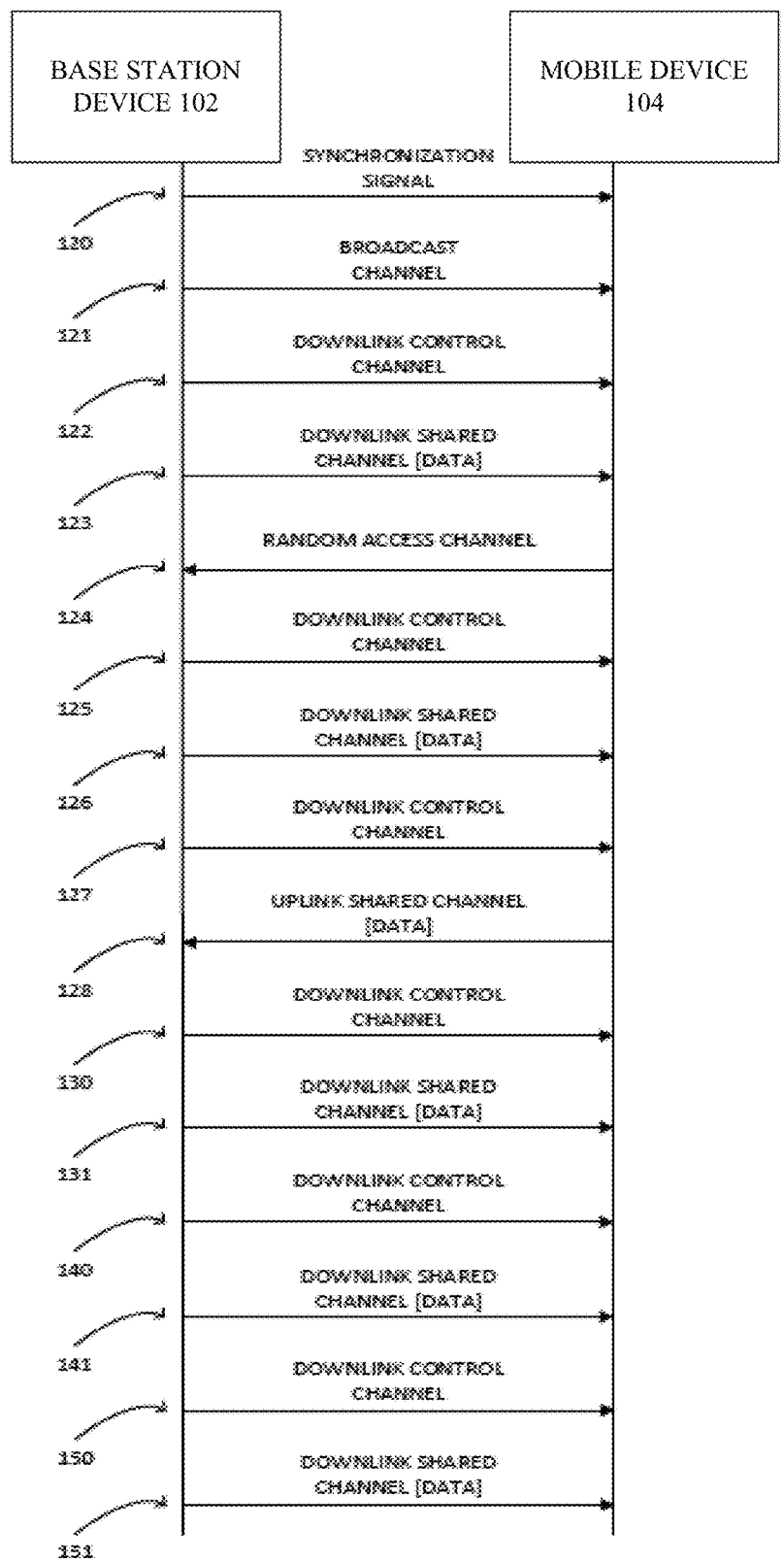
FIG. 1 illustrates an example, non-limiting message sequence flow chart to facilitate determination of transmission type via DMRS patterns in accordance with one or more embodiments described herein.

One or more embodiments are now described with reference to the drawings, wherein like reference numerals are used to refer to like elements throughout. In the following description, for purposes of explanation, numerous specific details are set forth in order to provide a thorough understanding of the various embodiments. It is evident, however, that the various embodiments can be practiced without these specific details (and without applying to any particular networked environment or standard).

As used in this disclosure, in some embodiments, the terms "component," "system" and the like are intended to refer to, or comprise, a computer-related entity or an entity related to an operational apparatus with one or more specific functionalities, wherein the entity can be either hardware, a combination of hardware and software, software, or software in execution. As an example, a component may be, but is not limited to being, a process running on a processor, a processor, an object, an executable, a thread of execution, computer-executable instructions, a program, and/or a computer. By way of illustration and not limitation, both an application running on a server and the server can be a component.

One or more components may reside within a process and/or thread of execution and a component may be localized on one computer and/or distributed between two or more computers. In addition, these components can execute from various computer readable media having various data structures stored thereon. The components may communicate via local and/or remote processes such as in accordance with a signal having one or more data packets (e.g., data from one component interacting with another component in a local system, distributed system, and/or across a network such as the Internet with other systems via the signal). As another example, a component can be an apparatus with specific functionality provided by mechanical parts operated by electric or electronic circuitry, which is operated by a software application or firmware application executed by a processor, wherein the processor can be internal or external to the apparatus and executes at least a part of the software or firmware application. As yet another example, a component can be an apparatus that provides specific functionality through electronic components without mechanical parts, the electronic components can comprise a processor therein to execute software or firmware that confers at least in part the functionality of the electronic components. While various components have been illustrated as separate components, it will be appreciated that multiple components can be implemented as a single component, or a single component can be implemented as multiple components, without departing from example embodiments.

Further, the various embodiments can be implemented as a method, apparatus or article of manufacture using standard programming and/or engineering techniques to produce software, firmware, hardware or any combination thereof to control a computer to implement the disclosed subject matter. The term "article of manufacture" as used herein is intended to encompass a computer program accessible from any computer-readable (or machine-readable) device or computer-readable (or machine-readable) storage/communications media. For example, computer readable storage media can comprise, but are not limited to, magnetic storage devices (e.g., hard disk, floppy disk, magnetic strips), optical disks (e.g., compact disk (CD), digital versatile disk (DVD)), smart cards, and flash memory devices (e.g., card, stick, key drive). Of course, those skilled in the art will recognize many modifications can be made to this configuration without departing from the scope or spirit of the various embodiments.

In addition, the words "example" and "exemplary" are used herein to mean serving as an instance or illustration. Any embodiment or design described herein as "example" or "exemplary" is not necessarily to be construed as preferred or advantageous over other embodiments or designs. Rather, use of the word example or exemplary is intended to present concepts in a concrete fashion. As used in this application, the term "or" is intended to mean an inclusive "or" rather than an exclusive "or". That is, unless specified otherwise or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims should generally be construed to mean "one or more" unless specified otherwise or clear from context to be directed to a singular form.

Moreover, terms such as "mobile device equipment," "mobile station," "mobile," subscriber station," "access terminal," "terminal," "handset," "communication device," "mobile device" (and/or terms representing similar terminology) can refer to a wireless device utilized by a subscriber or mobile device of a wireless communication service to receive or convey data, control, voice, video, sound, gaming or substantially any data-stream or signaling-stream. The foregoing terms are utilized interchangeably herein and with reference to the related drawings. Likewise, the terms "access point (AP)," "Base Station (BS)," BS transceiver, BS device, cell site, cell site device, "Node B (NB)," "evolved Node B (eNode B)," "home Node B (HNB)" and the like, are utilized interchangeably in the application, and refer to a wireless network component or appliance that transmits and/or receives data, control, voice, video, sound, gaming or substantially any data-stream or signaling-stream from one or more subscriber stations. Data and signaling streams can be packetized or frame-based flows.

Furthermore, the terms "device," "communication device," "mobile device," "subscriber," "customer entity," "consumer," "customer entity," "entity" and the like are employed interchangeably throughout, unless context warrants particular distinctions among the terms. It should be appreciated that such terms can refer to human entities or automated components supported through artificial intelligence (e.g., a capacity to make inference based on complex mathematical formalisms), which can provide simulated vision, sound recognition and so forth.

Embodiments described herein can be exploited in substantially any wireless communication technology, comprising, but not limited to, wireless fidelity (Wi-Fi), global system for mobile communications (GSM), universal mobile telecommunications system (UMTS), worldwide interoperability for microwave access (WiMAX), enhanced general packet radio service (enhanced GPRS), third generation partnership project (3GPP) long term evolution (LTE), third generation partnership project 2 (3GPP2) ultra mobile broadband (UMB), high speed packet access (HSPA), Z-Wave, Zigbee and other 802.XX wireless technologies and/or legacy telecommunication technologies.

3GPP is currently specifying a fifth generation (5G) cellular wireless communications system called New Radio (NR). One of its key differentiators from previous generation (4G) systems is the ability to schedule transmissions of flexible duration. In the Third Generation Partnership Project (3GPP) Long-Term Evolution (LTE) of the Universal Mobile Telecommunications Service (UMTS), transmissions are scheduled based on slots. A slot comprises seven Orthogonal Frequency Division Multiplexing (OFDM) symbols and transmissions are scheduled in pairs of slots whereby two slots are denoted as one subframe (14 OFDM symbols). Correspondingly, the Transmission Time Interval (TTI) of the downlink shared channel (DL-SCH) logical channel—carried in the physical layer on the Physical Downlink Shared Channel (PDSCH) in the downlink—and the uplink shared channel (UL-SCH) logical channel—carried in the physical layer on the Physical Uplink Shared Channel (PUSCH) in the uplink—is 1 millisecond (ms), namely, the subframe duration for a OFDM subcarrier spacing of 15 kilohertz (kHz).

In NR, the TTI duration is flexible. For one, the OFDM subcarrier spacing is not fixed to 15 kHz. Hence, the OFDM symbol duration, and thereby the slot duration (a slot is fixed to 14 OFDM symbols in NR) varies with the chosen subcarrier spacing of the transmission. In addition, NR supports mini-slots, e.g., transmission durations not based on slots (or a fixed number of symbols) but rather having a flexible number of symbols. Even for a slot based transmission the actual PDSCH or PUSCH durations is less than 14 OFDM symbols, the duration of the slot. That is because PDSCH or PUSCH transmissions within a slot are multiplexed with other channels and signals, e.g., Physical Downlink Control Channels (PDCCH) or Physical Uplink Control Channels (PUCCH). In case the transmission direction changes within a slot duration, e.g., both downlink and uplink transmissions are multiplexed within a slot duration, additional guards are provisioned that protect the downlink and uplink transmissions from each other, respectively, thereby further shortening the number of OFDM symbols available to a PDSCH or PUSCH transmission.

The transmission duration of a PDSCH or PUSCH is not fixed regardless of whether a transmission is considered slot based or mini-slot based. Nevertheless, slot based and mini-slot based transmissions have characteristics that make them distinct. For example, a slot based transmission typically is scheduled by a PDCCH at the beginning of a slot, e.g., on the first 1-3 OFDM symbols of a slot. Mini-slot based transmissions can equally be scheduled from the beginning of a slot but in addition, they can also be scheduled from any other OFDM symbol. Moreover, the Demodulation Reference Signal (DMRS) associated with a PDSCH/PUSCH may differ depending on whether the transmission is slot based or mini-slot based. In particular, a slot based PDSCH/PUSCH has its DMRS fixed on a certain OFDM symbol of the slot. For example, the Physical Broadcast Channel (PBCH) may signal in the MasterinformationBlock (MIB) the position of the DMRS for a slot based transmission. Due to these differences in characteristics, predominantly the DMRS position, actual specifications of a fifth generation cellular wireless communications system may refrain from using terms like slot based or mini-slot based. Nevertheless, someone skilled in the art will be able to apply the concepts of slot based and mini-slot based to descriptions that instead use the DMRS pattern or other characteristics to discern between the two.

Downlink Control Information (DCI) or DCI formats typically differentiate between slot based and mini-slot based transmissions. There are several problems with these solutions. Using DCI formats to indicate to the User Equipment (UE) (e.g., mobile device) whether a transmission is slot based or mini-slot based increases the number of blind decodes. A priori, the mobile device does not know whether a transmission will be slot based or mini-slot based when it tries to detect downlink control information. Hence, the mobile device typically has to try both hypotheses in decoding attempts. In addition, the mobile device may have to test different aggregation levels of control channel elements for each DCI format. Hence, using different DCI formats to indicate to a mobile device whether a transmission is slot based or mini-slot based is not efficient from a mobile device power consumption perspective.

Alternatively, the DCI itself may indicate in a single DCI format whether a transmission is slot based or mini-slot based. In this case, however, the mobile device needs to buffer the first N orthogonal frequency division multiplexed (OFDM) symbols preceding the demodulation reference signal (DMRS) position of a slot based transmission until the mobile device has decoded the DCI and knows whether the scheduled transmission uses the DMRS or a different DMRS position for a mini-slot based transmission. As explained above, the DMRS position of a slot based transmission is fixed on a certain OFDM symbol of the slot, e.g., as signaled by the Physical Broadcast Channel (PBCH) in the Master Information Block (MIB) whereas for a mini-slot based transmission the corresponding DMRS is transmitted on the first symbol of the actual PDSCH transmission which itself can start on any OFDM symbol. Imagine, for example, the case where the DCI is transmitted on the first OFDM symbol of a slot on some OFDM subcarriers. The DCI indicates that a PDSCH transmission also starts on the first OFDM symbol of the same slot, viz., the first OFDM symbol contains both resource elements of the PDCCH and the PDSCH it schedules. Furthermore, assume the DMRS position of slot based transmissions is fixed on the third OFDM symbol. Hence, channel estimation cannot commence until the mobile device has received the third OFDM symbol. In addition, some processing time is needed to perform channel estimation.

Until the mobile device has estimated the channel and can start decoding the PDSCH, the mobile device needs to buffer the received waveform. Only until the mobile device has decoded the DCI the mobile device knows the starting position of a PDSCH and possibly the DMRS position. Now assume that the DCI indicates a mini-slot based transmission that commences on the tenth OFDM symbol of the slot. Hence, its DMRS is also located on the tenth OFDM symbol. In this case, the mobile device unnecessarily performed channel estimation on the DMRS for slot based transmissions and unnecessarily buffered the waveform received at the beginning of the slot. Hence, there is an advantage to indicating to a mobile device (or having a framework that allows the mobile device to determine) a priori whether a transmission is slot based or mini-slot based.

Systems, methods and/or machine-readable storage media for facilitating demodulation reference signal patterns in a wireless communication system are provided herein. Legacy wireless systems such as LTE, Long-Term Evolution Advanced (LTE-A), High Speed Packet Access (HSPA) etc. can have downlink control channels that carry information about the scheduling grants. Typically this includes a number of multiple input multiple output (MIMO) layers scheduled, transport block sizes, modulation for each codeword, parameters related to hybrid automatic repeat request (HARQ), subband locations and also precoding matrix index corresponding to the sub bands.

Typically, the following information can be transmitted based on the downlink control information (DCI) format: Localized/Distributed virtual resource block (VRB) assignment flag, resource block assignment, modulation and coding scheme, HARQ process number, new data indicator, redundancy version, transmit power control (TPC) command for uplink control channel, downlink assignment index, precoding matrix index and/or number of layers.

As used herein, "5G" can also be referred to as New Radio (NR) access. Accordingly, systems, methods and/or machine-readable storage media for facilitating demodulation reference signal patterns in a wireless communication system are provided herein. As used herein, one or more aspects of a 5G network can comprise, but is not limited to, data rates of several tens of megabits per second (Mbps) supported for tens of thousands of users; at least one gigabit per second (Gbps) to be offered simultaneously to tens of users (e.g., tens of workers on the same office floor); several hundreds of thousands of simultaneous connections supported for massive sensor deployments; spectral efficiency significantly enhanced compared to 4G; improvement in coverage relative to 4G; signaling efficiency enhanced compared to 4G; and/or latency significantly reduced compared to LTE.

One or more embodiments described herein can include systems, apparatus, methods and/or machine-readable storage media that can facilitate demodulation reference signal patterns in a wireless communication system are provided herein in a 5G wireless communication system are provided herein. In one embodiment, an apparatus is provided. Apparatus and methods are proposed that enable a receiver and/or a transmitter of a mobile device to differentiate between slot based and mini-slot based transmissions in a 5G cellular wireless communications system.

In one embodiment, an apparatus can comprise: a processor; and a memory that stores executable instructions that, when executed by the processor, facilitate performance of operations. The operations can comprise: generating information according to a protocol for receipt by a mobile device, wherein the information is indicative of a defined transmission type for the mobile device and wherein the protocol employs demodulation reference signal patterns; and transmitting the information to the mobile device.

In another embodiment, a method is provided. The method comprises: generating, by a device comprising a processor, information according to a protocol for receipt by a mobile device, wherein the information is indicative of a defined transmission type for the mobile device, and wherein the protocol employs demodulation reference signal patterns; and transmitting, by the device, the information to the mobile device.

In yet another embodiment, a machine-readable storage medium, comprising executable instructions that, when executed by a processor of an apparatus, facilitate performance of operations is provided. The operations comprise: receiving information according to a protocol from a base station device, wherein the information is indicative of a defined transmission type for the mobile device and wherein the protocol employs demodulation reference signal patterns; and communicating information content based on the protocol, wherein the protocol comprises a first protocol in which the information comprises a first message transmitted in a first group of resources, wherein the first message communicates, to the mobile device, a first downlink control information format associated with a first transmission type, wherein the protocol further comprises a second protocol in which the information comprises a second message transmitted in a second group of resources, and wherein the second message communicates, to the mobile device, a second downlink control information format associated with a second transmission type.

One or more embodiments can provide a priori knowledge of the DMRS pattern (viz. transmission type) at the mobile device thereby addressing the aforementioned problems of existing solutions such as mobile device power consumption or mobile device implementation cost, e.g., by reducing the number of blind decodes at the mobile device or its buffering requirements.

FIG. 1 illustrates an example, non-limiting message sequence flow chart to facilitate determination of transmission type via DMRS patterns in accordance with one or more embodiments described herein. In one embodiment, for each Control Resource Set (CORESET) the mobile device is informed about the DCI formats it has to monitor. In particular, it can be configured to monitor for DCI formats corresponding to either slot based or mini-slot base transmissions or both.

In another embodiment, the DMRS position is configured by the Radio Resource Protocol (RRC) in the mobile device higher layers. Alternatively, several DMRS positions can be RRC configured whereby specified rules/protocols let the mobile device determine which DMRS pattern is associated with a given transmission. In yet another embodiment, a bitmap can be RRC configured in the mobile device higher layers indicating a DMRS pattern for one or more particular times.

The system 100 described herein can provide for facilitating determination of transmission type (e.g., by a mobile device such as mobile device 104) via demodulation reference signal (DMRS) patterns. For example, the system 100 can enable the mobile device 104 to determine whether the transmission type is slot-based transmission or mini-slot-based transmission.

Turning to FIG. 1, one or more embodiments can enable the BS device 102 to dynamically control and/or change transmission type for information sent to the mobile device 104 behavior dynamically. As used herein, dynamical control can mean control of transmission type that can change from time to time.

At 120, the base station device 102 sends a synchronization signal for the mobile device 104 to detect cell, and perform time/frequency synchronization. At 121, the base station device 102 sends a broadcast channel for a mobile device 104 to decode master information block. At 122, the downlink control channel is sent by the base station device 102 and schedules the downlink shared channel (data) shown at 123. At 123, the downlink shared channel (data) is sent by the base station device 102 for the mobile device 104 to obtain random access channel (RACH) (step 124) configuration. The RACH is sent by the mobile device 104 to allow the base station device 102 to detect the mobile device 104. 125 is sent by the base station device 102 and schedules 126 which is termed the random access response (RAR). At 126, the downlink shared channel (data) is sent by the base station device 102 and informs the mobile device 104 about timing advance (TA) information and a temporary identifier for the mobile device among other things.

At 127, the downlink control channel information is sent by the BS device 102 and schedules the uplink shared channel (data) at 128. At 128, the uplink shared channel (data) is sent by the mobile device 104, confirms RAR in 126, and allows the mobile device 104 to signal its capabilities.

Steps 130, 131, 140, 141 and 150, 151 pertains to one or more embodiments described herein. At 130, the downlink control channel schedules the downlink shared channel (data), which is sent in step 131. In 131, the mobile device 104 may be configured according to some embodiments herein. In step 140, the BS device 102 schedules downlink control channel (data), which is 141. In particular, in 140 the BS device 102 may convey to the mobile device 104 information to demodulate data in 141 according to some embodiments herein. At 141, downlink shared channel (data) is transmitted. At 150, the BS schedules, via the downlink control channel, the downlink shared channel (data) that is transmitted at 151. In particular, in 150 the BS device 102 may convey to the mobile device 104 other information to demodulate data in 151 according to other embodiments herein.

As used herein, the term "BS device 102" can be interchangeable with (or include) a network, a network controller or any number of other network components.

As such, one or more embodiments can enable the BS device 102 to dynamically signal the mobile device 104 to receive information via slot or mini-slot-based transmission.

Additional detail regarding the specific embodiments regarding how transmission type will be indicated employing demodulated reference signals will be discussed with reference to FIGS. 1-9.

Figure 2:
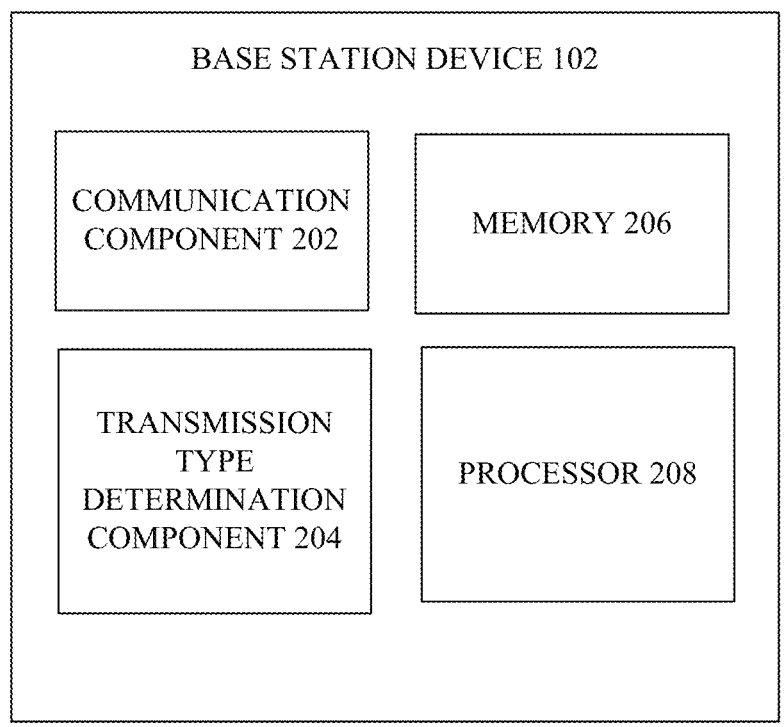
FIG. 2 illustrates an example, non-limiting block diagram of a base station device that can facilitate determination of transmission type via DMRS patterns accordance with one or more embodiments described herein.
Figure 3:
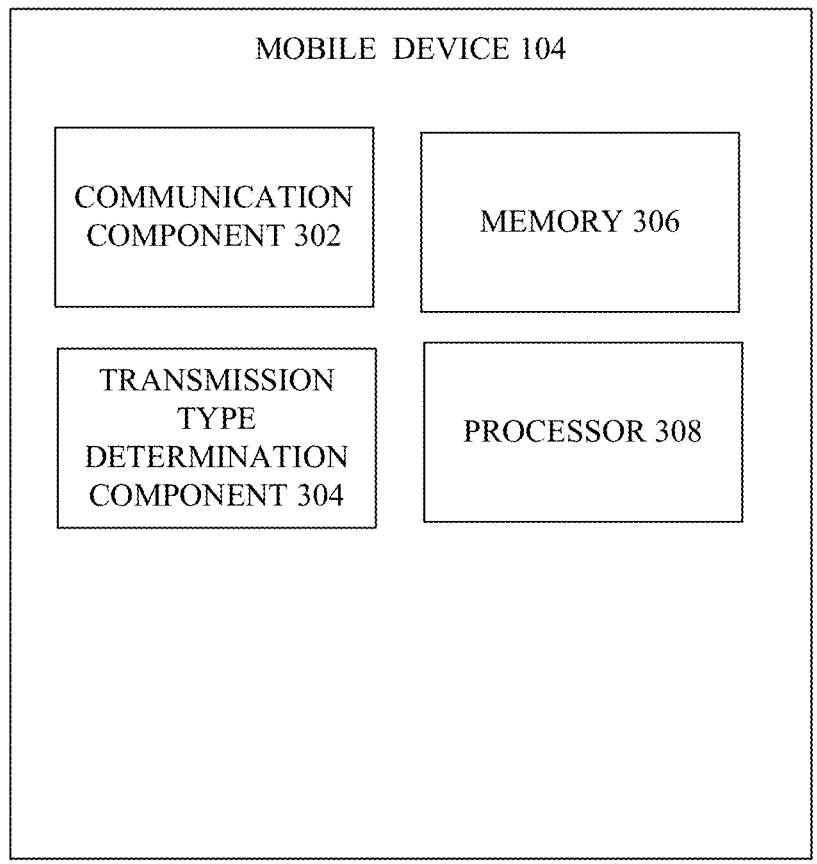
FIG. 3 illustrates an example, non-limiting block diagram of a mobile device for which determination of transmission type via DMRS patterns can be facilitated in accordance with one or more embodiments described herein.

FIG. 2 illustrates an example, non-limiting block diagram of a base station device that can facilitate determination of transmission type via DMRS patterns accordance with one or more embodiments described herein. FIG. 3 illustrates an example, non-limiting block diagram of a mobile device for which determination of transmission type via DMRS patterns can be facilitated in accordance with one or more embodiments described herein. Repetitive description of like elements employed in other embodiments described herein is omitted for sake of brevity.

As shown in FIG. 2, the base station device 102 can comprise communication component 202, transmission type component 204, memory 206 and/or processor 208. In some embodiments, one or more of communication component 202, transmission type component 204, memory 206 and/or processor 208 can be electrically and/or communicatively coupled to one another to perform one or more functions of base station device 102. As shown in FIG. 3, mobile device 104 can comprise communication component 302, transmission type component 304, memory 306 and/or processor 308. In various embodiments, one or more of communication component 302, transmission type component 304, memory 306 and/or processor 308 can be electrically and/or communicatively coupled to one another to perform one or more functions of base station device 102.

Referring to FIGS. 1, 2 and 3, the communication component 202 can transmit and/or receive control and/or data information to and/or from one or more mobile devices (e.g., mobile device 104) (e.g., to and/or from communication component 302 of the mobile device). In some embodiments, the communication component 202 can transmit information generated by the base station device 102 transmission type component 204. The transmission type component 204 of the base station device 102 can generate information according to a protocol for receipt by the mobile device 104, and the mobile device 104 transmission type component 304 can determine and/or evaluate the information generated by the base station device 102 and sent to the mobile device 104.

In some embodiments, the transmission type component 204 can generate information according to a protocol for receipt by the mobile device 104, wherein the information is indicative of a defined transmission type for the mobile device 104 and wherein the protocol employs DMRS patterns.

In one embodiment, the mobile device 104 monitors for different CORESETs. If a first CORESET is received, the mobile device 104 assumes that one type of transmission will follow and if a second CORESET is received, the mobile device 104 assumes that a second type of transmission will follow from the base station device 102. In various embodiments, the first or second type of transmission can be a slot-based transmission or a mini-slot-based transmission. A slot-based transmission or a mini-slot-based transmission may be differentiated by its DMRS patterns, respectively.

Thus, with reference to FIGS. 1, 2 and 3, when the mobile device 104 powers on and connects to the network (e.g., base station device 102), the mobile device 104 can receive information as part of initial setup and the mobile device 104 can receive information from the network identifying which CORESET is associated with which DCI format. A first CORESET can be indicated as associated with a first DCI format and a second CORESET can be indicated as associated with a second DCI format. The particular DCI format can then be associated with either slot transmission or mini-slot transmission.

For example, in one embodiment, the mobile device 104 is configured with CORESETs that are associated with DCI formats. When the mobile device monitors for PDCCH transmissions from the base station device 102 according to a given CORESET configuration, the mobile device 104 only monitors for DCI formats according to the association. For example, one set of DCI formats can be associated with one DMRS pattern (e.g., a defined DMRS pattern that indicates the transmission type from the base station device 102 to the mobile device 104 is slot based transmission). Another set of DCI formats can be associated with another DMRS pattern (e.g., a defined DMRS pattern that indicates the transmission type from the base station device 102 to the mobile device 104 is mini-slot based transmission). In some embodiments, the mobile device 104 has a priori knowledge of which DCI formats to expect in a given CORESET. Therefore, the mobile device 104 can adapt the mobile device 104 behavior correspondingly. For example, when the mobile device 104 tries to blindly detect PDCCH transmissions in a given CORESET, the mobile device 104 may only monitor for PDCCH transmissions with a certain DCI payload.

Accordingly, in this embodiment, DCI formats are configured and associated with two sets of Control Resource Sets (CORESETs). If the base station device 102 transmitter sends the PDCCH scheduling a PDSCH message (e.g., downlink data from the base station device 102) in a first set of CORESETs, the mobile device 104 transceiver expects a first type of DCI format. Similarly, if the base station device 102 transmitter sends the PDCCH scheduling a PDSCH message (e.g., downlink data from the base station device 102) in a second set of CORESETs, the mobile device 104 transceiver expects a second type of DCI format.

Another approach to determining transmission type can be described with reference to another embodiment. In this embodiment, the mobile device 104 is configured with CORESETs that are associated with DMRS patterns directly. While the previous embodiment followed a three step process including associating CORESET to DCI format to DMRS position (which indicated the transmission type), in this embodiment, a two step process is followed. In both embodiments, implicit signaling (viz. a CORESET configuration) facilitates a mobile device 104 determination of whether a first transmission type or a second transmission type will be provided to the mobile device 104 from the base station device 102.

In this embodiment, when the mobile device 104 detects a PDCCH transmission in a given CORESET, the mobile device 104 assumes the DMRS pattern associated with that CORESET for the PDSCH scheduled by the PDCCH. The DMRS pattern indicates the transmission type.

In some embodiments, the mobile device 104 has a priori knowledge of which DMRS pattern to expect in a given CORESET and therefore can adapt its behavior correspondingly. For example, the mobile device 104 may adapt its channel estimation algorithm based on the CORESET in which the PDCCH scheduling the PDSCH was transmitted.

Another approach to determining transmission type can employ explicit information to indicate the transmission type. For example, an explicit payload bit value of the DCI is provided whereas in the previous embodiment, the use of one or two CORESETs (one or two sets of CORESETs respectively) was an implicit indicator of transmission type. In this embodiment, the bit value in a payload received by the mobile device 104 (or the number of bits in the payload) can indicate in transmission type.

In yet another embodiment, each CORESET configuration transmitted from the base station device 102 to the mobile device 104 contains a bitmap corresponding to slots in a given numerology. Numerology comprises an OFDM subcarrier spacing and a cyclic prefix length. The slots that are addressed by the bitmap may be consecutive or non-consecutive. For example, certain slots may always be associated with either slot based transmission or mini-slot based transmissions and therefore excluded from the bitmap. Alternatively, the bitmap may not correspond to slots but rather to OFDM symbols. Similarly, the symbols addressable by the bitmap may be consecutive or non-consecutive. In either embodiment, the bitmap can indicate to the mobile device 104 whether a PDCCH transmitted in the CORESET associated with the bitmap corresponds to a slot based or mini-slot based transmission. For example, a bit value of zero can indicate that if the mobile device receives a PDCCH in a slot/symbol corresponding to the zero bit value, the PDSCH scheduled by the PDCCH corresponds to a slot based transmission. Alternatively, a bit value of one can indicate that if the mobile device receives a PDCCH in a slot/symbol corresponding to the bit value of one, the PDSCH scheduled by the PDCCH corresponds to a mini-slot based transmission. Note that while the terms "slot" and "mini-slot" are used in the application, the embodiments herein are not so limited and the term "slot" can represent any protocol characterized by a defined DMRS position, the term "mini-slot" can represent any protocol characterized by another defined DMRS position. Moreover, a combination of bitmaps could be applied, a first bitmap corresponding to slots and a second bitmap corresponding to OFDM symbols within a slot. Said second bitmap could be of length 14 to address every single OFDM symbol of a slot. Alternatively, said second bitmap could be of length less than 14 where some OFDM symbols are assumed by mobile device 104 to have a default behavior. For example, some OFDM symbols may always be associated with a first transmission type (first DMRS pattern, respectively). Said first bitmap could signal whether for a given slot a second bitmap is applied or not. If no second bitmap is applied, the mobile device 104 assumes a slot based transmission for said slot. If a second bitmap is applied, said second bitmap indicates for every OFDM symbol in said slot whether to expect a PDCCH in said OFDM symbol. For any transmission scheduled by such a PDCCH the mobile device 104 then assumes a mini-slot based transmission. In other words, if no second bitmap is applied, the mobile device 104 assumes a first DMRS pattern. If a second bitmap is applied, said second bitmap indicates for every OFDM symbol in said slot whether to expect a PDCCH in said OFDM symbol. For any transmission scheduled by such a PDCCH the mobile device 104 then assumes a second DMRS pattern.

Figure 4:
FIG. 4 illustrates an example, non-limiting illustration of a slot transmission type that can be determined via DMRS patterns in accordance with one or more embodiments described herein.
Figure 5:
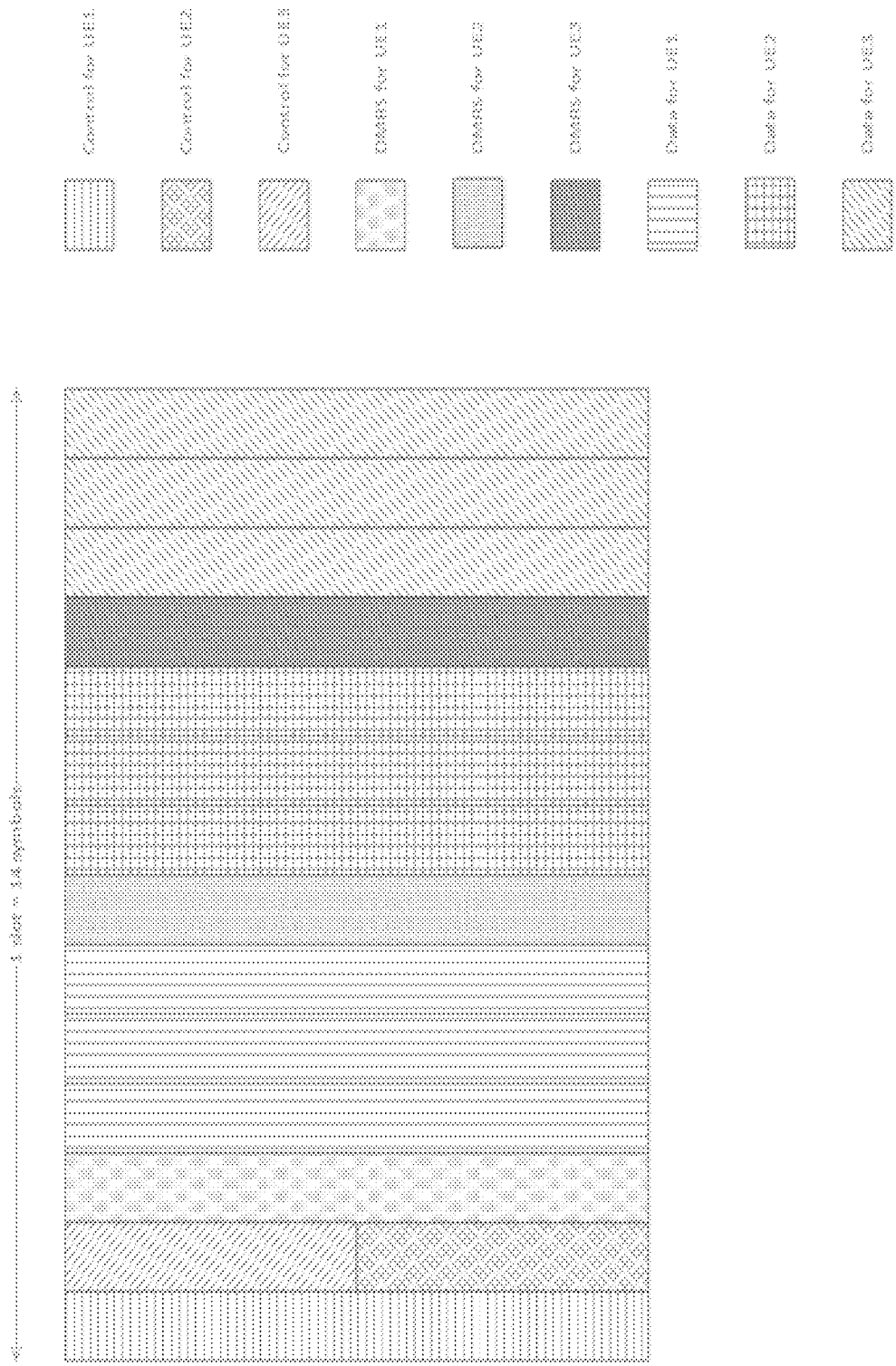
FIG. 5 illustrates an example, non-limiting illustration of a mini-slot transmission type that can be determined via DMRS patterns in accordance with one or more embodiments described herein.

FIG. 4 illustrates an example, non-limiting illustration of a slot transmission type that can be determined via DMRS patterns in accordance with one or more embodiments described herein. FIG. 5 illustrates an example, non-limiting illustration of a mini-slot transmission type that can be determined via DMRS patterns in accordance with one or more embodiments described herein. Repetitive description of like elements employed in other embodiments described herein is omitted for sake of brevity.

As shown in FIG. 4, for slot based transmissions control information is transmitted in OFDM symbols at the beginning of a slot (a slot having 14 OFDM symbols). Once the mobile device 104 has determined that the transmission type is slot based per the embodiments described above it can then demodulate the data.

As shown in FIG. 5, for mini-slots, since the control information can start anywhere in the slot, the mobile device 104 would typically have to evaluate each of the 14 symbols to determine the location of the control information. Excessive power consumption or buffer overflow due to the inability for the mobile device 104 to decode fast enough could result. Thus, in the above embodiments, the mobile device 104 can determine in which symbols to expect control information (and the mobile device 104 can decode such symbols in lieu of decoding all 14 symbols). While FIG. 5 illustrates an example, non-limiting illustration of a mini-slot transmission type that can be determined via DMRS patterns in accordance with one or more embodiments described herein, it is understood that the control information for mini-slots need not be at the beginning of a slot. This is just one example and the control information could be located at any region within the slot.

In one example, the fifth generation cellular wireless communications system coexists with LTE in overlapping spectrum. NR transmissions can occur on LTE TDD UL subframes or in LTE MBSFN subframes. In LTE TDD UL subframes, the NR PDCCH can be transmitted on the first OFDM symbol using the DMRS pattern associated with slot based transmissions, e.g., fixed to a given OFDM symbol. In LTE MBSFN subframes, the beginning of a slot is occupied by the legacy LTE control region. Hence, mini-slots need to be scheduled in the MBSFN region of the MBSFN subframe. Consequently, transmissions scheduled in LTE MBSFN subframes use the DMRS pattern associated with mini-slots. In this example, the aforementioned bitmap corresponds to the LTE MBSFN subframe configuration. In slots corresponding to non-MBSFN subframes, the PDCCH occurs at the beginning of a slot and schedules slot based PDSCH transmissions, in slots corresponding to MBSFN subframes, the PDCCH occurs at the beginning of the MBSFN region of the corresponding MBSFN subframe and schedules mini-slot based PDSCH transmissions.

In another example, the bitmap only indicates when a mobile device is expected to monitor for possible PDCCH transmissions and other information according to the embodiments herein are used to indicate the DMRS position of an associated PDSCH. For example, the bitmap that is part of the CORESET configuration indicates the OFDM symbol on which to monitor for PDCCH transmissions and the DCI format or a bit field in the DCI itself indicates the DMRS position of the associated PDSCH. In this embodiment, each bit of the bitmap (or, in some embodiments, one or more embodiments of the bitmap) corresponds to a symbol.

In another example, if the mobile device receives the bitmap and determines that the bitmap does not have the control information in the first symbol(s) of a slot then the mobile device 104 can implicitly determine that the transmission is mini-slot based. Thus, in some embodiments, the CORESET need not contain additional information regarding the transmission type (DMRS pattern respectively) and the mobile device 104 can determine transmission type by merely evaluating the content of the bitmap.

In the aforementioned embodiments, the transmission type is dynamically indicated by control channel transmissions, either implicitly by the CORESET or explicitly in the DCI.

Turning back to FIGS. 2 and 3, memory 206 can be a computer-readable storage medium storing computer-executable instructions and/or information configured to perform one or more of the functions described herein with reference to the base station device 102. For example, in some embodiments, the memory 206 can store computer-readable storage media associated with determining information indicative of transmission type, DMRS pattern and the like. The processor 208 can perform one or more of the functions described herein with reference to the base station device 102.

The memory 306 can be a computer-readable storage medium storing computer-executable instructions and/or information configured to perform one or more of the functions described herein with reference to the mobile device 104. For example, in some embodiments, the memory 306 can store computer-readable storage media associated with determining information indicative of transmission type, DCI format, DMRS pattern and the like. The processor 306 can perform one or more of the functions described herein with reference to the mobile device 104.

Figure 6:
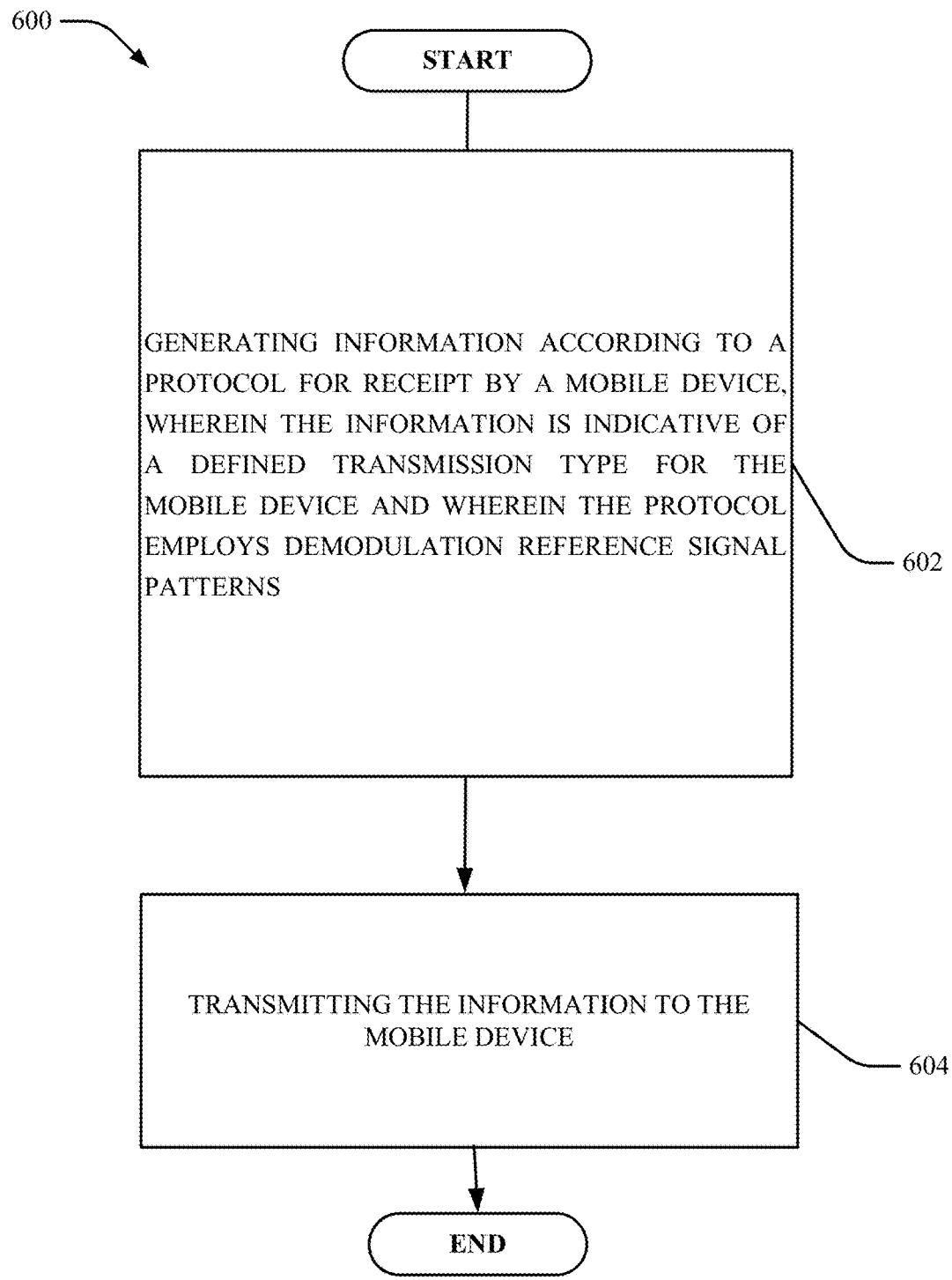
FIGS. 6, 7, 8 and 9 illustrate flowcharts of methods that facilitate determination of transmission type via DMRS patterns accordance with one or more embodiments described herein.

FIGS. 6, 7, 8 and 9 illustrate flowcharts of methods that facilitate determination of transmission type via DMRS patterns accordance with one or more embodiments described herein. Turning first to FIG. 6, at 602, method 600 can comprise generating information according to a protocol for receipt by a mobile device, wherein the information is indicative of a defined transmission type for the mobile device and wherein the protocol employs demodulation reference signal patterns. At 604, method 600 can comprise transmitting the information to the mobile device.

In some embodiments, the protocol comprises a first protocol in which the information comprises a first message comprising a bitmap representative of defined information, wherein first information of the defined information is indicative of a first transmission type and wherein second information of the defined information is indicative of a second transmission type. In some embodiments, the first transmission type comprises a slot transmission type and wherein the second transmission type comprises a mini-slot transmission type different from the first transmission type.

Figure 7:
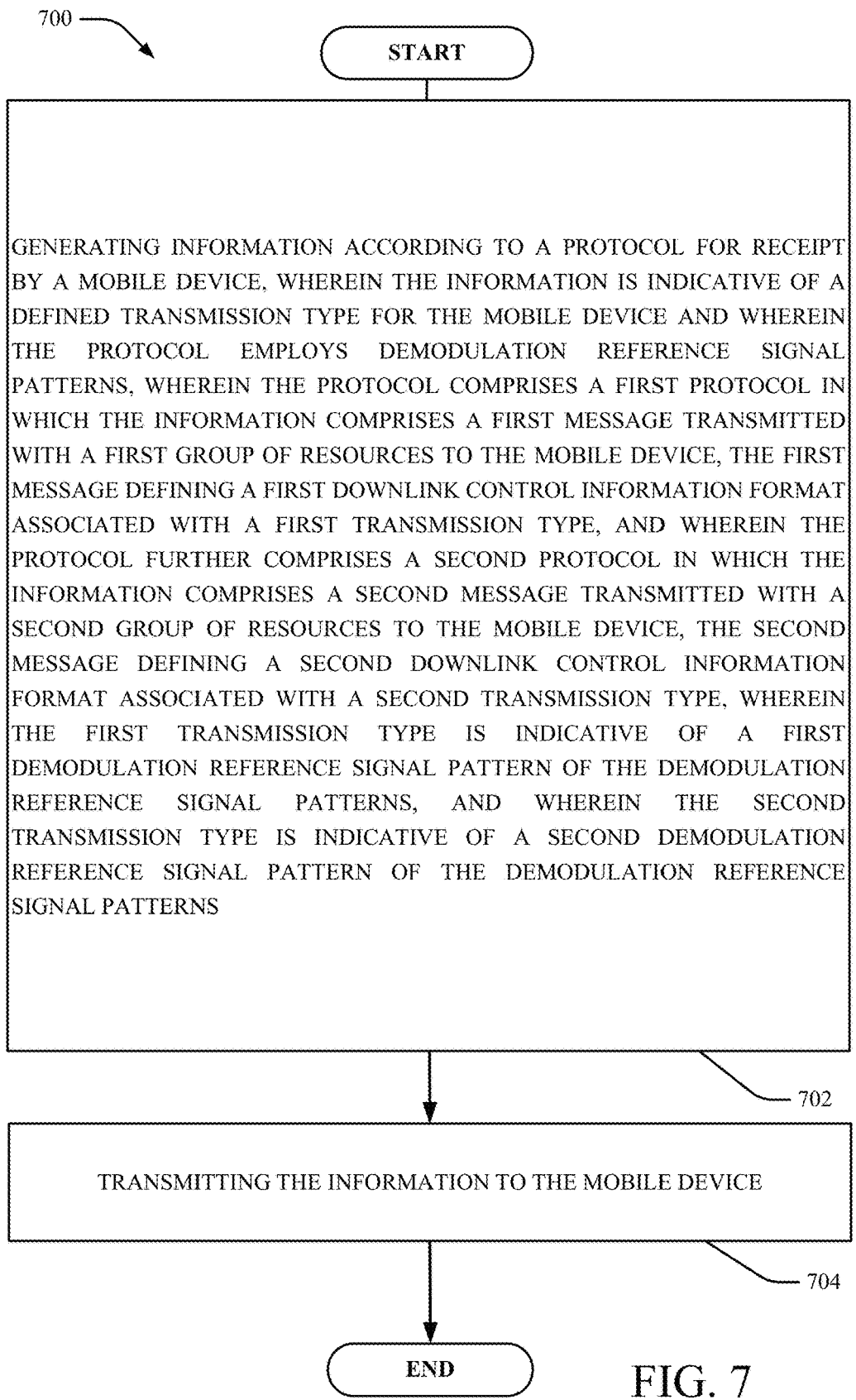

Turning now to FIG. 7, at 702, method 700 can comprise generating information according to a protocol for receipt by a mobile device, wherein the information is indicative of a defined transmission type for the mobile device and wherein the protocol employs demodulation reference signal patterns, wherein the protocol comprises a first protocol in which the information comprises a first message transmitted with a first group of resources to the mobile device, the first message defining a first downlink control information format associated with a first transmission type, and wherein the protocol further comprises a second protocol in which the information comprises a second message transmitted with a second group of resources to the mobile device, the second message defining a second downlink control information format associated with a second transmission type, wherein the first transmission type is indicative of a first demodulation reference signal pattern of the demodulation reference signal patterns, wherein the first demodulation reference signal pattern is associated with the defined transmission type being a first transmission type, wherein the second transmission type is indicative of a second demodulation reference signal pattern of the demodulation reference signal patterns. At 704, method 700 can comprise transmitting the information to the mobile device.

In some embodiments, the first transmission type is a slot transmission type and wherein the second transmission type is a mini-slot transmission type. In some embodiments, the information indicative of the defined transmission type is transmitted via a physical downlink control channel.

Figure 8:
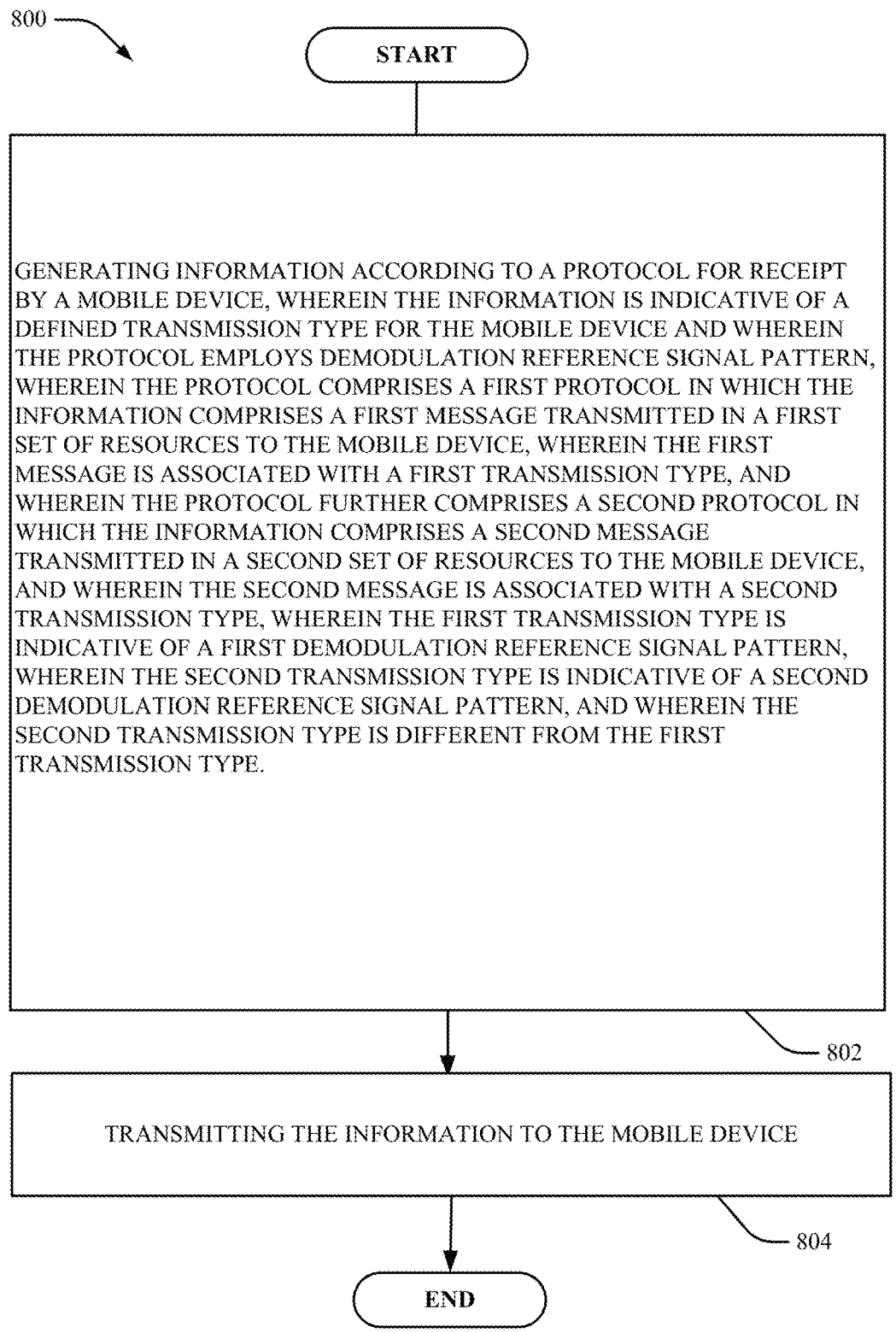

Turning now to FIG. 8, at 802, method 800 can comprise generating information according to a protocol for receipt by a mobile device, wherein the information is indicative of a defined transmission type for the mobile device and wherein the protocol employs demodulation reference signal pattern, wherein the protocol comprises a first protocol in which the information comprises a first message transmitted in a first set of resources to the mobile device, wherein the first message is associated with a first transmission type, and wherein the protocol further comprises a second protocol in which the information comprises a second message transmitted in a second set of resources to the mobile device, and wherein the second message is associated with a second transmission type.

In some embodiments, the first transmission type is indicative of a first demodulation reference signal pattern, wherein the second transmission type is indicative of a second demodulation reference signal pattern, and wherein the second transmission type is different from the first transmission type.

Figure 9:
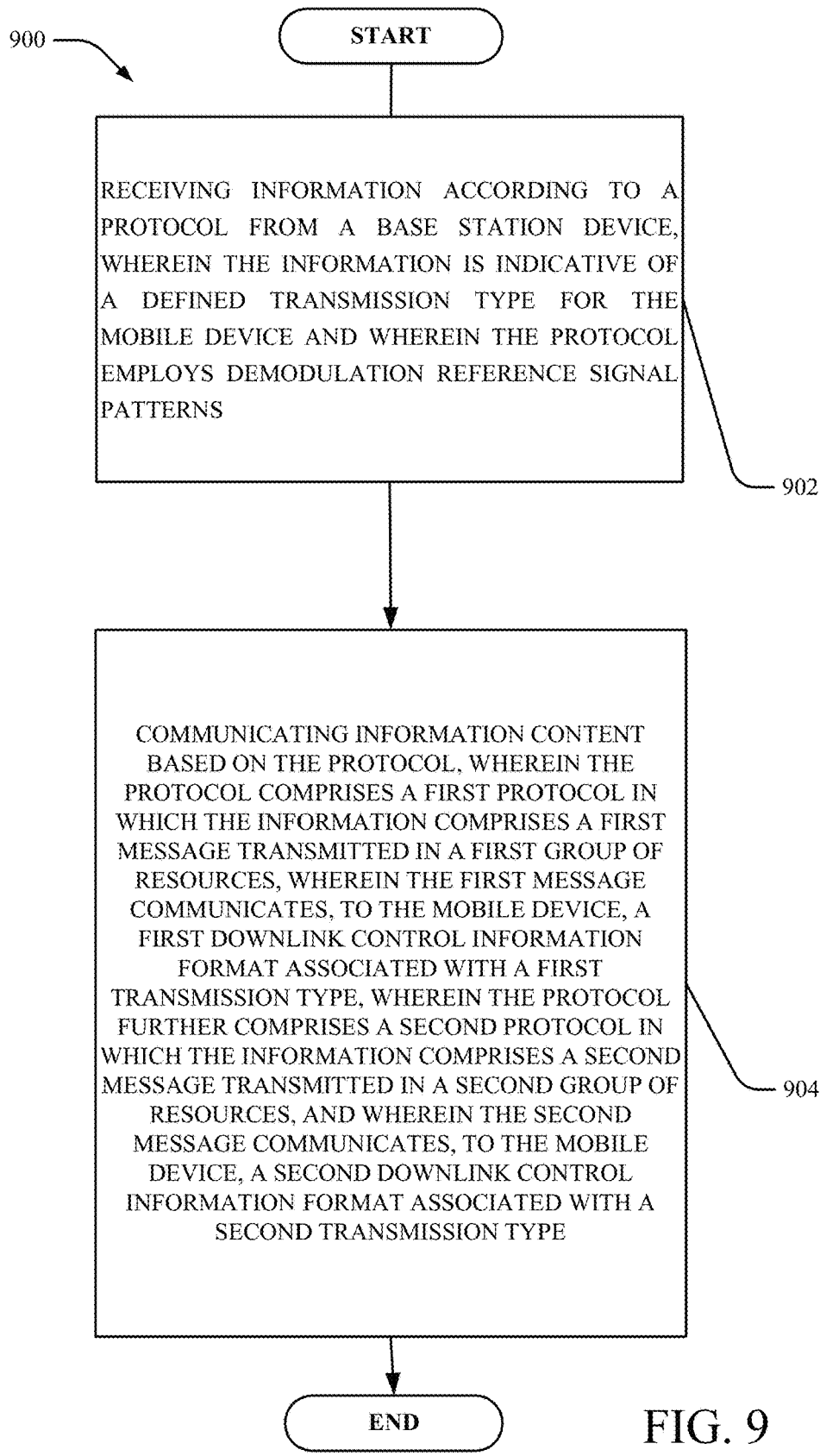

Turning now to FIG. 9, at 902, method 900 can comprise receiving information according to a protocol from a base station device, wherein the information is indicative of a defined transmission type for the mobile device and wherein the protocol employs demodulation reference signal patterns. At 904, method 900 can comprise communicating information content based on the protocol, wherein the protocol comprises a first protocol in which the information comprises a first message transmitted in a first group of resources, wherein the first message communicates, to the mobile device, a first downlink control information format associated with a first transmission type, wherein the protocol further comprises a second protocol in which the information comprises a second message transmitted in a second group of resources, and wherein the second message communicates, to the mobile device, a second downlink control information format associated with a second transmission type.

In some embodiments, the first transmission type is indicative of a first demodulation reference signal pattern of the demodulation reference signal patterns, which is associated with the defined transmission type being a first transmission type, wherein the second transmission type is indicative of a second demodulation reference signal pattern of the demodulation reference signal patterns, which is associated with the defined transmission type being a second transmission type.

In some embodiments, the first transmission type is a slot transmission type, and wherein the second transmission type is a mini-slot transmission type.

Figure 10:
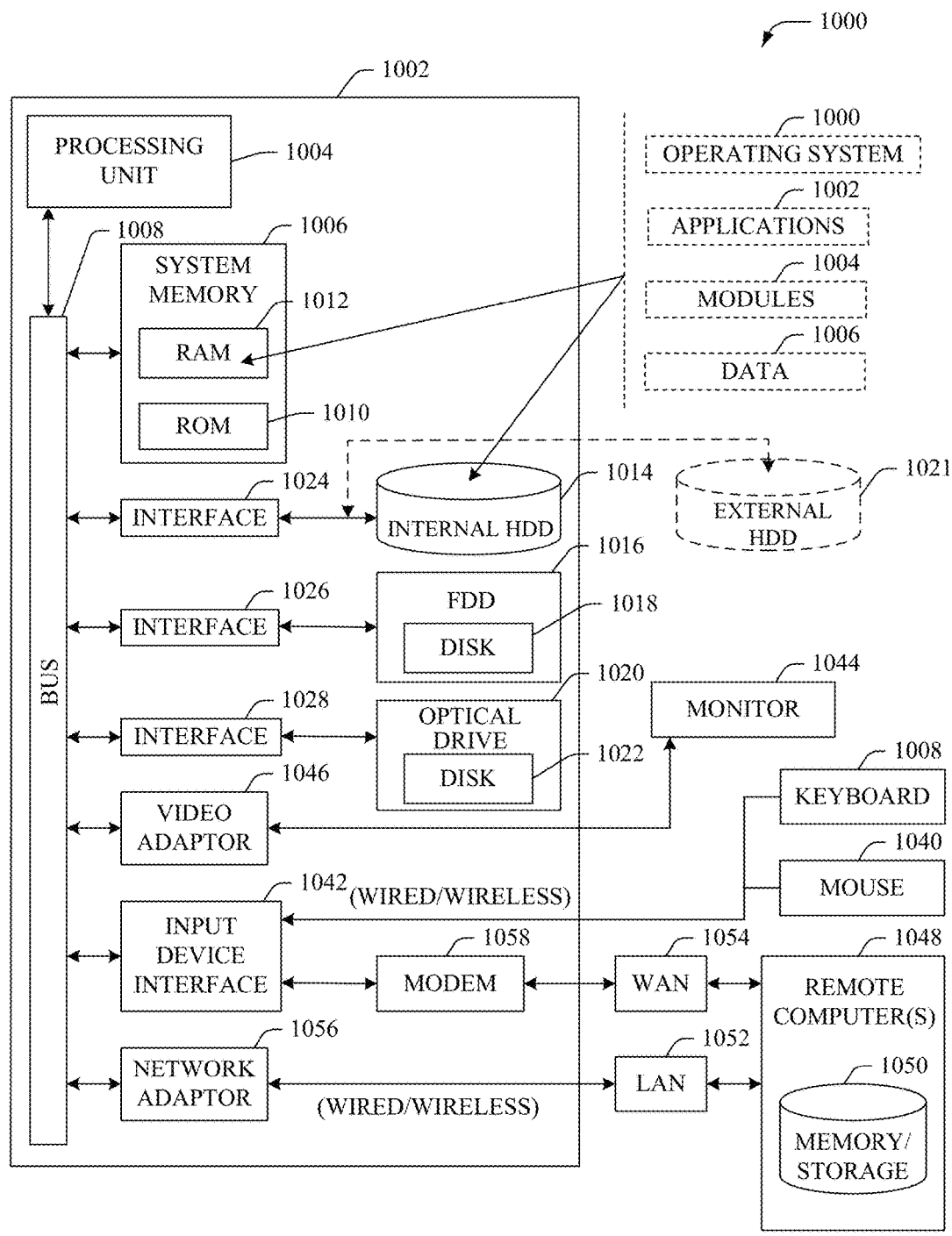
FIG. 10 illustrates a block diagram of a computer that can be employed in accordance with one or more embodiments described herein.

FIG. 10 illustrates a block diagram of a computer that can be employed in accordance with one or more embodiments. Repetitive description of like elements employed in other embodiments described herein is omitted for sake of brevity.

In some embodiments, the computer, or a component of the computer, can be or be comprised within any number of components described herein comprising, but not limited to, base station device 102 or mobile device 104 (or a component of base station device 102 or mobile device 104). In order to provide additional text for various embodiments described herein, FIG. 10 and the following discussion are intended to provide a brief, general description of a suitable computing environment 1000 in which the various embodiments of the embodiment described herein can be implemented. While the embodiments have been described above in the general context of computer-executable instructions that can run on one or more computers, those skilled in the art will recognize that the embodiments can be also implemented in combination with other program modules and/or as a combination of hardware and software.

Generally, program modules comprise routines, programs, components, data structures, etc., that perform particular tasks or implement particular abstract data types. Moreover, those skilled in the art will appreciate that the inventive methods can be practiced with other computer system configurations, comprising single-processor or multiprocessor computer systems, minicomputers, mainframe computers, as well as personal computers, hand-held computing devices, microprocessor-based or programmable consumer electronics, and the like, each of which can be operatively coupled to one or more associated devices.

The terms "first," "second," "third," and so forth, as used in the claims, unless otherwise clear by context, is for clarity only and doesn't otherwise indicate or imply any order in time. For instance, "a first determination," "a second determination," and "a third determination," does not indicate or imply that the first determination is to be made before the second determination, or vice versa, etc.

The illustrated embodiments of the embodiments herein can be also practiced in distributed computing environments where certain tasks are performed by remote processing devices that are linked through a communications network. In a distributed computing environment, program modules can be located in both local and remote memory storage devices.

Computing devices typically comprise a variety of media, which can comprise computer-readable (or machine-readable) storage media and/or communications media, which two terms are used herein differently from one another as follows. Computer-readable (or machine-readable) storage media can be any available storage media that can be accessed by the computer (or a machine, device or apparatus) and comprises both volatile and nonvolatile media, removable and non-removable media. By way of example, and not limitation, computer-readable (or machine-readable) storage media can be implemented in connection with any method or technology for storage of information such as computer-readable (or machine-readable) instructions, program modules, structured data or unstructured data. Tangible and/or non-transitory computer-readable (or machine-readable) storage media can comprise, but are not limited to, random access memory (RAM), read only memory (ROM), electrically erasable programmable read only memory (EEPROM), flash memory or other memory technology, compact disk read only memory (CD-ROM), digital versatile disk (DVD) or other optical disk storage, magnetic cassettes, magnetic tape, magnetic disk storage, other magnetic storage devices and/or other media that can be used to store desired information. Computer-readable (or machine-readable) storage media can be accessed by one or more local or remote computing devices, e.g., via access requests, queries or other data retrieval protocols, for a variety of operations with respect to the information stored by the medium.

In this regard, the term "tangible" herein as applied to storage, memory or computer-readable (or machine-readable) media, is to be understood to exclude only propagating intangible signals per se as a modifier and does not relinquish coverage of all standard storage, memory or computer-readable (or machine-readable) media that are not only propagating intangible signals per se.

In this regard, the term "non-transitory" herein as applied to storage, memory or computer-readable (or machine-readable) media, is to be understood to exclude only propagating transitory signals per se as a modifier and does not relinquish coverage of all standard storage, memory or computer-readable (or machine-readable) media that are not only propagating transitory signals per se.

Communications media typically embody computer-readable (or machine-readable) instructions, data structures, program modules or other structured or unstructured data in a data signal such as a modulated data signal, e.g., a channel wave or other transport mechanism, and comprises any information delivery or transport media. The term "modulated data signal" or signals refers to a signal that has one or more of its characteristics set or changed in such a manner as to encode information in one or more signals. By way of example, and not limitation, communication media comprise wired media, such as a wired network or direct-wired connection, and wireless media such as acoustic, RF, infrared and other wireless media.

With reference again to FIG. 10, the example environment 1000 for implementing various embodiments of the embodiments described herein comprises a computer 1002, the computer 1002 comprising a processing unit 1004, a system memory 1006 and a system bus 1008. The system bus 1008 couples system components comprising, but not limited to, the system memory 1006 to the processing unit 1004. The processing unit 1004 can be any of various commercially available processors. Dual microprocessors and other multiprocessor architectures can also be employed as the processing unit 1004.

The system bus 1008 can be any of several types of bus structure that can further interconnect to a memory bus (with or without a memory controller), a peripheral bus, and a local bus using any of a variety of commercially available bus architectures. The system memory 1006 comprises ROM 1010 and RAM 1012. A basic input/output system (BIOS) can be stored in a non-volatile memory such as ROM, erasable programmable read only memory (EPROM), EEPROM, which BIOS contains the basic routines that help to transfer information between elements within the computer 1002, such as during startup. The RAM 1012 can also comprise a high-speed RAM such as static RAM for caching data.

The computer 1002 further comprises an internal hard disk drive (HDD) 1010 (e.g., EIDE, SATA), which internal hard disk drive 1014 can also be configured for external use in a suitable chassis (not shown), a magnetic floppy disk drive 1016, (e.g., to read from or write to a removable diskette 1018) and an optical disk drive 1020, (e.g., reading a CD-ROM disk 1022 or, to read from or write to other high capacity optical media such as the DVD). The hard disk drive 1014, magnetic disk drive 1016 and optical disk drive 1020 can be connected to the system bus 1008 by a hard disk drive interface 1024, a magnetic disk drive interface 1026 and an optical drive interface, respectively. The interface 1024 for external drive implementations comprises at least one or both of Universal Serial Bus (USB) and Institute of Electrical and Electronics Engineers (IEEE) 1394 interface technologies. Other external drive connection technologies are within contemplation of the embodiments described herein.

The drives and their associated computer-readable (or machine-readable) storage media provide nonvolatile storage of data, data structures, computer-executable instructions, and so forth. For the computer 1002, the drives and storage media accommodate the storage of any data in a suitable digital format. Although the description of computer-readable (or machine-readable) storage media above refers to a hard disk drive (HDD), a removable magnetic diskette, and a removable optical media such as a CD or DVD, it should be appreciated by those skilled in the art that other types of storage media which are readable by a computer, such as zip drives, magnetic cassettes, flash memory cards, cartridges, and the like, can also be used in the example operating environment, and further, that any such storage media can contain computer-executable instructions for performing the methods described herein.

A number of program modules can be stored in the drives and RAM 1012, comprising an operating system 1030, one or more application programs 1032, other program modules 1034 and program data 1036. All or portions of the operating system, applications, modules, and/or data can also be cached in the RAM 1012. The systems and methods described herein can be implemented utilizing various commercially available operating systems or combinations of operating systems.

A communication device can enter commands and information into the computer 1002 through one or more wired/wireless input devices, e.g., a keyboard 1038 and a pointing device, such as a mouse 1040. Other input devices (not shown) can comprise a microphone, an infrared (IR) remote control, a joystick, a game pad, a stylus pen, touch screen or the like. These and other input devices are often connected to the processing unit 1004 through an input device interface 1042 that can be coupled to the system bus 1008, but can be connected by other interfaces, such as a parallel port, an IEEE 1394 serial port, a game port, a universal serial bus (USB) port, an IR interface, etc.

A monitor 1044 or other type of display device can be also connected to the system bus 1008 via an interface, such as a video adapter 1046. In addition to the monitor 1044, a computer typically comprises other peripheral output devices (not shown), such as speakers, printers, etc.

The computer 1002 can operate in a networked environment using logical connections via wired and/or wireless communications to one or more remote computers, such as a remote computer(s) 1048. The remote computer(s) 1048 can be a workstation, a server computer, a router, a personal computer, portable computer, microprocessor-based entertainment appliance, a peer device or other common network node, and typically comprises many or all of the elements described relative to the computer 1002, although, for purposes of brevity, only a memory/storage device 1050 is illustrated. The logical connections depicted comprise wired/wireless connectivity to a local area network (LAN) 1052 and/or larger networks, e.g., a wide area network (WAN) 1054. Such LAN and WAN networking environments are commonplace in offices and companies, and facilitate enterprise-wide computer networks, such as intranets, all of which can connect to a global communications network, e.g., the Internet.

When used in a LAN networking environment, the computer 1002 can be connected to the local network 1052 through a wired and/or wireless communication network interface or adapter 1056. The adapter 1056 can facilitate wired or wireless communication to the LAN 1052, which can also comprise a wireless AP disposed thereon for communicating with the wireless adapter 1056.

When used in a WAN networking environment, the computer 1002 can comprise a modem 1058 or can be connected to a communications server on the WAN 1054 or has other means for establishing communications over the WAN 1054, such as by way of the Internet. The modem 1058, which can be internal or external and a wired or wireless device, can be connected to the system bus 1008 via the input device interface 1042. In a networked environment, program modules depicted relative to the computer 1002 or portions thereof, can be stored in the remote memory/storage device 1050. It will be appreciated that the network connections shown are example and other means of establishing a communications link between the computers can be used.

The computer 1002 can be operable to communicate with any wireless devices or entities operatively disposed in wireless communication, e.g., a printer, scanner, desktop and/or portable computer, portable data assistant, communications satellite, any piece of equipment or location associated with a wirelessly detectable tag (e.g., a kiosk, news stand, restroom), and telephone. This can comprise Wireless Fidelity (Wi-Fi) and BLUETOOTH® wireless technologies. Thus, the communication can be a defined structure as with a conventional network or simply an ad hoc communication between at least two devices.

Wi-Fi can allow connection to the Internet from a couch at home, a bed in a hotel room or a conference room at work, without wires. Wi-Fi is a wireless technology similar to that used in a cell phone that enables such devices, e.g., computers, to send and receive data indoors and out; anywhere within the range of a femto cell device. Wi-Fi networks use radio technologies called IEEE 802.11 (a, b, g, n, etc.) to provide secure, reliable, fast wireless connectivity. A Wi-Fi network can be used to connect computers to each other, to the Internet, and to wired networks (which can use IEEE 802.3 or Ethernet). Wi-Fi networks operate in the unlicensed 2.4 and 5 GHz radio bands, at an 11 Mbps (802.11a) or 54 Mbps (802.11b) data rate, for example or with products that contain both bands (dual band), so the networks can provide real-world performance similar to the basic 10 Base T wired Ethernet networks used in many offices.

The embodiments described herein can employ artificial intelligence (AI) to facilitate automating one or more features described herein. The embodiments (e.g., in connection with automatically identifying acquired cell sites that provide a maximum value/benefit after addition to an existing communication network) can employ various AI-based schemes for carrying out various embodiments thereof. Moreover, the classifier can be employed to determine a ranking or priority of each cell site of an acquired network. A classifier is a function that maps an input attribute vector, $x=(x1, x2, x3, x4, \ldots, xn)$, to a confidence that the input belongs to a class, that is, $f(x)=\text{confidence(class)}$. Such classification can employ a probabilistic and/or statistical-based analysis (e.g., factoring into the analysis utilities and costs) to prognose or infer an action that a communication device desires to be automatically performed. A support vector machine (SVM) is an example of a classifier that can be employed. The SVM operates by finding a hypersurface in the space of possible inputs, which the hypersurface attempts to split the triggering criteria from the non-triggering events. Intuitively, this makes the classification correct for testing data that is near, but not identical to training data. Other directed and undirected model classification approaches comprise, e.g., naïve Bayes, Bayesian networks, decision trees, neural networks, fuzzy logic models, and probabilistic classification models providing different patterns of independence can be employed. Classification as used herein also is inclusive of statistical regression that is utilized to develop models of priority.

As will be readily appreciated, one or more of the embodiments can employ classifiers that are explicitly trained (e.g., via a generic training data) as well as implicitly trained (e.g., via observing communication device behavior, operator preferences, historical information, receiving extrinsic information). For example, SVMs can be configured via a learning or training phase within a classifier constructor and feature selection module. Thus, the classifier(s) can be used to automatically learn and perform a number of functions, comprising but not limited to determining according to a predetermined criteria which of the acquired cell sites will benefit a maximum number of subscribers and/or which of the acquired cell sites will add minimum value to the existing communication network coverage, etc.

As employed herein, the term "processor" can refer to substantially any computing processing unit or device comprising, but not limited to comprising, single-core processors; single-processors with software multithread execution capability; multi-core processors; multi-core processors with software multithread execution capability; multi-core processors with hardware multithread technology; parallel platforms; and parallel platforms with distributed shared memory. Additionally, a processor can refer to an integrated circuit, an application specific integrated circuit (ASIC), a digital signal processor (DSP), a field programmable gate array (FPGA), a programmable logic controller (PLC), a complex programmable logic device (CPLD), a discrete gate or transistor logic, discrete hardware components or any combination thereof designed to perform the functions described herein. Processors can exploit nano-scale architectures such as, but not limited to, molecular and quantum-dot based transistors, switches and gates, in order to optimize space usage or enhance performance of communication device equipment. A processor can also be implemented as a combination of computing processing units.

As used herein, terms such as "data storage," "database," and substantially any other information storage component relevant to operation and functionality of a component, refer to "memory components," or entities embodied in a "memory" or components comprising the memory. It will be appreciated that the memory components or computer-readable (or machine-readable) storage media, described herein can be either volatile memory or nonvolatile memory or can comprise both volatile and nonvolatile memory.

Memory disclosed herein can comprise volatile memory or nonvolatile memory or can comprise both volatile and nonvolatile memory. By way of illustration, and not limitation, nonvolatile memory can comprise read only memory (ROM), programmable ROM (PROM), electrically programmable ROM (EPROM), electrically erasable PROM (EEPROM) or flash memory. Volatile memory can comprise random access memory (RAM), which acts as external cache memory. By way of illustration and not limitation, RAM is available in many forms such as static RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), and direct Rambus RAM (DRRAM). The memory (e.g., data storages, databases) of the embodiments are intended to comprise, without being limited to, these and any other suitable types of memory.

What has been described above comprises mere examples of various embodiments. It is, of course, not possible to describe every conceivable combination of components or methodologies for purposes of describing these examples, but one of ordinary skill in the art can recognize that many further combinations and permutations of the present embodiments are possible. Accordingly, the embodiments disclosed and/or claimed herein are intended to embrace all such alterations, modifications and variations that fall within the spirit and scope of the appended claims. Furthermore, to the extent that the term "comprises" is used in either the detailed description or the claims, such term is intended to be inclusive in a manner similar to the term "comprising" as "comprising" is interpreted when employed as a transitional word in a claim.

What is claimed is:

1. An apparatus, comprising:
   a processor; and
   a memory that stores executable instructions that, when executed by the processor, facilitate performance of operations, comprising:
      generating information according to a protocol for receipt by a mobile device, wherein the information is indicative of a defined transmission type for the mobile device and wherein the protocol employs demodulation reference signal patterns; and
      transmitting the information to the mobile device, wherein the protocol comprises a first protocol in which the information comprises a first message transmitted with a first group of resources to the mobile device, the first message defining a first downlink control information format associated with a first transmission type, and wherein the protocol further comprises a second protocol in which the information comprises a second message transmitted with a second group of resources to the mobile device, the second message defining a second downlink control information format associated with a second transmission type.

2. The apparatus of claim 1, wherein the first transmission type is indicative of a first demodulation reference signal pattern of the demodulation reference signal patterns.

3. The apparatus of claim 2, wherein the first transmission type is a slot transmission type and wherein the second transmission type is a mini-slot transmission type.

4. The apparatus of claim 2, wherein the second transmission type is indicative of a second demodulation reference signal pattern of the demodulation reference signal patterns.

5. The apparatus of claim 1, wherein the information indicative of the defined transmission type is transmitted via a physical downlink control channel.

6. The apparatus of claim 1, wherein the protocol comprises a first protocol in which the information comprises a first message transmitted in a first set of resources to the mobile device, wherein the first message comprises a first transmission type.

7. The apparatus of claim 6, wherein the protocol further comprises a second protocol in which the information comprises a second message transmitted in a second set of resources to the mobile device, and wherein the second message comprises a second transmission type.

8. The apparatus of claim 7, wherein the first transmission type is indicative of a first demodulation reference signal pattern, wherein the second transmission type is indicative of a second demodulation reference signal pattern, and wherein the second transmission type is different from the first transmission type.

9. The apparatus of claim 1, wherein the protocol comprises a first protocol in which the information comprises a first message comprising a bitmap representative of defined information, wherein first information of the defined information is indicative of a first transmission type and wherein second information of the defined information is indicative of a second transmission type.

10. The apparatus of claim 9, wherein the first transmission type comprises a slot transmission type and wherein the second transmission type comprises a mini-slot transmission type different from the first transmission type.

11. A method, comprising:
    generating, by a device comprising a processor, information according to a protocol for receipt by a mobile device, wherein the information is indicative of a defined transmission type for the mobile device, and wherein the protocol employs demodulation reference signal patterns; and
    transmitting, by the device, the information to the mobile device, wherein the protocol comprises a first protocol in which the information comprises a first message transmitted in first resources in order to communicate, to the mobile device, a first downlink control information format associated with a first transmission type, and wherein the protocol further comprises a second protocol in which the information comprises a second message transmitted in second resources to communicate, to the mobile device, a second downlink control information format associated with a second transmission type.

12. The method of claim 11, wherein the first transmission type is indicative of a first demodulation reference signal pattern of the demodulation reference signal patterns, and wherein the second transmission type is indicative of a second demodulation reference signal pattern of the demodulation reference signal patterns, wherein the second transmission type is different from the first transmission type.

13. The method of claim 12, wherein the first transmission type is a slot transmission type, and wherein the second transmission type is a mini-slot transmission type.

14. The method of claim 11, wherein the protocol comprises a first protocol in which the information comprises a first message transmitted in first resources to communicate, to the mobile device, a first transmission type.

15. The method of claim 14, wherein the protocol further comprises a second protocol in which the information comprises a second message transmitted in second resources to communicate, to the mobile device, a second transmission type.

16. The method of claim 15, wherein the first transmission type is indicative of a first demodulation reference signal pattern, wherein the second transmission type is indicative of a second demodulation reference signal pattern, and wherein the second transmission type is different from the first transmission type.

17. A non-transitory machine-readable medium, comprising executable instructions that, when executed by a processor, facilitate performance of operations, comprising:
    receiving information according to a protocol from a base station device, wherein the information is indicative of a defined transmission type for the mobile device and wherein the protocol employs demodulation reference signal patterns; and
    communicating information content based on the protocol, wherein the protocol comprises a first protocol in which the information comprises a first message transmitted in a first group of resources, wherein the first message communicates, to the mobile device, a first downlink control information format associated with a first transmission type, wherein the protocol further comprises a second protocol in which the information comprises a second message transmitted in a second group of resources, and wherein the second message communicates, to the mobile device, a second downlink control information format associated with a second transmission type.

18. The non-transitory machine-readable medium of claim 17, wherein the first transmission type is indicative of a first demodulation reference signal pattern of the demodulation reference signal patterns, and wherein the second transmission type is indicative of a second demodulation reference signal pattern of the demodulation reference signal patterns.

19. The non-transitory machine-readable medium of claim 18, wherein the first transmission type is a slot transmission type.

20. The non-transitory machine-readable medium of claim 19, wherein the second transmission type is a mini-slot transmission type.

\* \* \* \* \*